(12) United States Patent
Saitoh et al.

(10) Patent No.: US 6,597,516 B2
(45) Date of Patent: Jul. 22, 2003

(54) LENS FRAME STRUCTURE FOR OPTICAL AXIS ADJUSTMENT

(75) Inventors: Noboru Saitoh, Saitama (JP); Yoshihiro Yamazaki, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/173,163

(22) Filed: Jun. 18, 2002

(65) Prior Publication Data
US 2003/0007260 A1 Jan. 9, 2003

(30) Foreign Application Priority Data

Jul. 4, 2001 (JP) ......................... 2001-203428

(51) Int. Cl.⁷ ............................. G02B 15/14; G02B 7/02
(52) U.S. Cl. ........................ 359/694; 704/823
(58) Field of Search ....................... 359/694, 703, 359/704, 823

(56) References Cited

U.S. PATENT DOCUMENTS 5,510,936 A   4/1996   Aoki et al. ................. 359/822
5,555,480 A   9/1996   Tanaka et al. ............... 359/822
5,754,350 A * 5/1998   Sato .......................... 359/818

FOREIGN PATENT DOCUMENTS

JP   200113388   1/2001
JP   200127723   1/2001

* cited by examiner

*Primary Examiner*—Ricky Mack
(74) *Attorney, Agent, or Firm*—Greenblum & Bernstein, P.L.C.

(57) ABSTRACT

A lens frame structure for optical axis adjustment includes a first frame having a central opening and a first reference surface normal to an optical axis, a second frame supporting a lens group to be aligned with the central opening, the second frame having a radial flange which has a second reference surface normal to the optical axis and contacting the first reference surface so that the second frame is movable in a direction normal to the optical axis, and a plurality of cutout portions formed on the radial flange, wherein an adhesive is inserted into each of the plurality of cutout portions to bond the second frame to the first frame.

17 Claims, 5 Drawing Sheets

LENS FRAME STRUCTURE FOR OPTICAL AXIS ADJUSTMENT

BACKGROUND OF THE INVENTION

1. Field of the Invention

The present invention relates to a lens frame structure for optical axis adjustment.

2. Description of the Related Art

In recent years small and high-resolution lens systems have been required for lens systems in digital cameras or the like. As a consequence, it is often the case that the focusing sensitivity (eccentricity sensitivity) of a lens group in a lens system becomes very large. The lens group can be a single lens or a plurality of lenses. For instance, a tolerance of eccentricity of a lens group having a high focusing sensitivity is required within a range of a few micrometers. In order to minimize the eccentricity of a lens group, conventionally the precision of the fit between the lens group and a lens frame thereof or the precision of the fit between a lens frame that supports the lens group and another lens frame have been increased. However, it is very difficult to minimize the eccentricity of a lens group to within a few micrometers simply by increasing such precisions.

SUMMARY OF THE INVENTION

The present invention has been devised in view of the problems noted above. The present invention provides a lens frame structure which makes it possible to carry out a centering operation on a lens group without relying on the aforementioned precisions of the fit between the lens group and a lens frame thereof or the precision of the fit between a lens frame that supports the lens group and another lens frame.

For example, a lens frame structure for optical axis adjustment is provided, including a first frame having a central opening and a first reference surface normal to an optical axis; a second frame supporting a lens group to be aligned with the central opening, the second frame having a radial flange which has a second reference surface normal to the optical axis and contacting the first reference surface so that the second frame is movable in a direction normal to the optical axis; and a plurality of cutout portions formed on the radial flange, wherein an adhesive is inserted into each of the plurality of cutout portions to bond the second frame to the first frame.

It is desirable for the second frame to be provided with a cylindrical portion to be inserted to the central opening of the first frame with a radial clearance so that the second frame is movable in a direction normal to the optical axis.

The radial flange can be divided into a plurality of radial lugs on which the plurality of cutout portions are respectively formed.

Each of the plurality of cutout portions can be recessed radially inwards from an outer edge of a corresponding one of the plurality of radial lugs so as to be substantially rectangular in cross section.

Each of the plurality of cutout portions can be recessed radially inwards from an outer edge of corresponding one of the plurality of radial lugs so as to be substantially semicircular in cross section.

A plurality of recesses can be formed on the first reference surface to correspond to the plurality of cutout portions, respectively, the adhesive permeating into the plurality of recesses from the plurality of cutout portions, respectively, when the adhesive is inserted into the plurality of cutout portions.

It is desirable for the plurality of recesses to be larger than the plurality of cutout portions in a direction perpendicular to the optical axis.

The lens frame structure can further include a relative positioning device for positioning the second frame relative to the first frame at a predetermined rotational angle.

The adhesive can be a UV curable adhesive.

The lens frame structure can include a relative positioning device for positioning the second frame relative to the first frame at a predetermined angle of rotation, wherein the relative positioning device includes a reference recess formed on the first reference surface, and a reference cutout portion formed on the second reference surface. The plurality of cutout portions are respectively aligned with the plurality of recesses in an axial direction of the first member and the second member by aligning the reference cutout portion with the reference recess in the axial direction.

It is desirable for the reference recess to be formed smaller than each of the plurality of recesses to be visually distinguishable from each of the plurality of recesses.

It is desirable for the reference cutout portion to be formed smaller than each the plurality of cutout portions to be visually distinguishable from each the plurality of cutout portions.

The lens element can be a cemented lens including a front lens element and a rear lens element which are cemented to each other, the rear lens element being directly supported by the second frame so that the front lens element is supported by the second frame via the rear lens element.

The first frame can be guided in an optical axis direction.

The lens frame structure can be incorporated in a zoom lens barrel, the first frame being moved in an optical axis direction to perform a zooming operation.

The lens frame structure can be incorporated in a digital camera.

In another embodiment, a lens frame which supports a lens group is provided, including a first ring portion having a central opening and a first reference surface extending in a radial direction of the first ring portion, and a second ring portion supporting at least one lens element of the lens group and having a second reference surface extending in a radial direction of the second ring portion, the second ring portion being fitted into the first ring portion in a state where at least a part of the second ring portion is loosely fitted in the central opening with the second reference surface remaining in contact with the first reference surface. The second ring portion includes at least one radial flange on which the second reference surface is formed, and a plurality of cutout portions formed on the at least one radial flange, an adhesive being put into each of the plurality of cutout portions to bond the second ring portion to the first ring portion.

The present disclosure relates to subject matter contained in Japanese Patent Application No.2001-203428 (filed on Jul. 4, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 5:
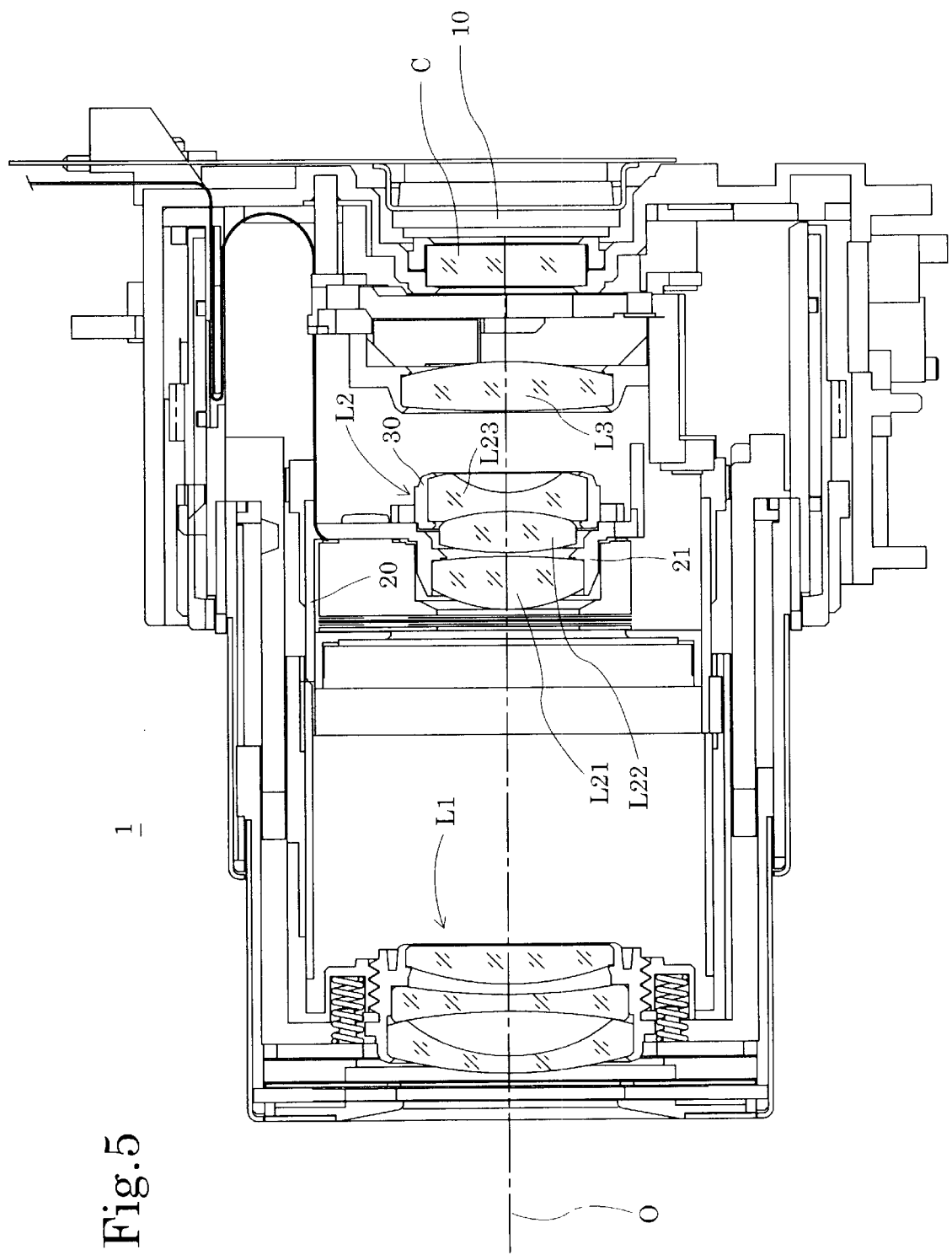
FIG. 5 is an axial cross sectional view of a zoom lens barrel which incorporates the moving frame and the lens frame which are shown in FIGS. 1 and 4.

FIG. 5 shows a zoom lens barrel of a digital camera which incorporates an embodiment of a lens frame structure for centering a lens element according to the present invention. The zoom lens barrel 1 is provided with a photographing lens system including a first lens group L1, a second lens group L2 and a third lens group L3, in that order from the object side (the left side as viewed in FIG. 5). A CCD 10 serving as an image pick-up device is positioned behind the third lens group L3. A low-pass filter C is positioned immediately in front of the CCD 10. A zooming operation is carried out by moving the first lens group L1 and the second lens group L2 in a direction of an optical axis O (i.e., in the optical axis direction) of the photographing lens system while varying the distance therebetween, while a focusing operation is carried out by moving the third lens group L3 in the optical axis direction relative to the CCD 10. The mechanism for moving each of the first, second and third lens groups does not relate to the subject matter of the present invention, and therefore is not herein discussed.

The lens frame structure for optical axis adjustment of a lens element according to the present invention is embodied in a structure supporting the second lens group L2. As shown in FIG. 5, the second lens group L2 includes of a front lens element L21, a middle lens L22 and a rear lens element L23, in that order from the object side. The middle lens element L22 and the rear lens element L23 are cemented to each other to serve as a cemented lens (doublet). The focusing sensitivity of the front lens L21 and the cemented lens (L22 and L23) is very large compared with the other lens groups; therefore any eccentricity thereof has to be minimized as much as possible. According to the present embodiment of the lens frame structure for optical axis adjustment of a lens element, the cemented lens (L22 and L23) is centered with respect to the front lens element L21 to align the optical axes of the front lens element L21 and the cemented lens (L22 and L23).

Figure 4:
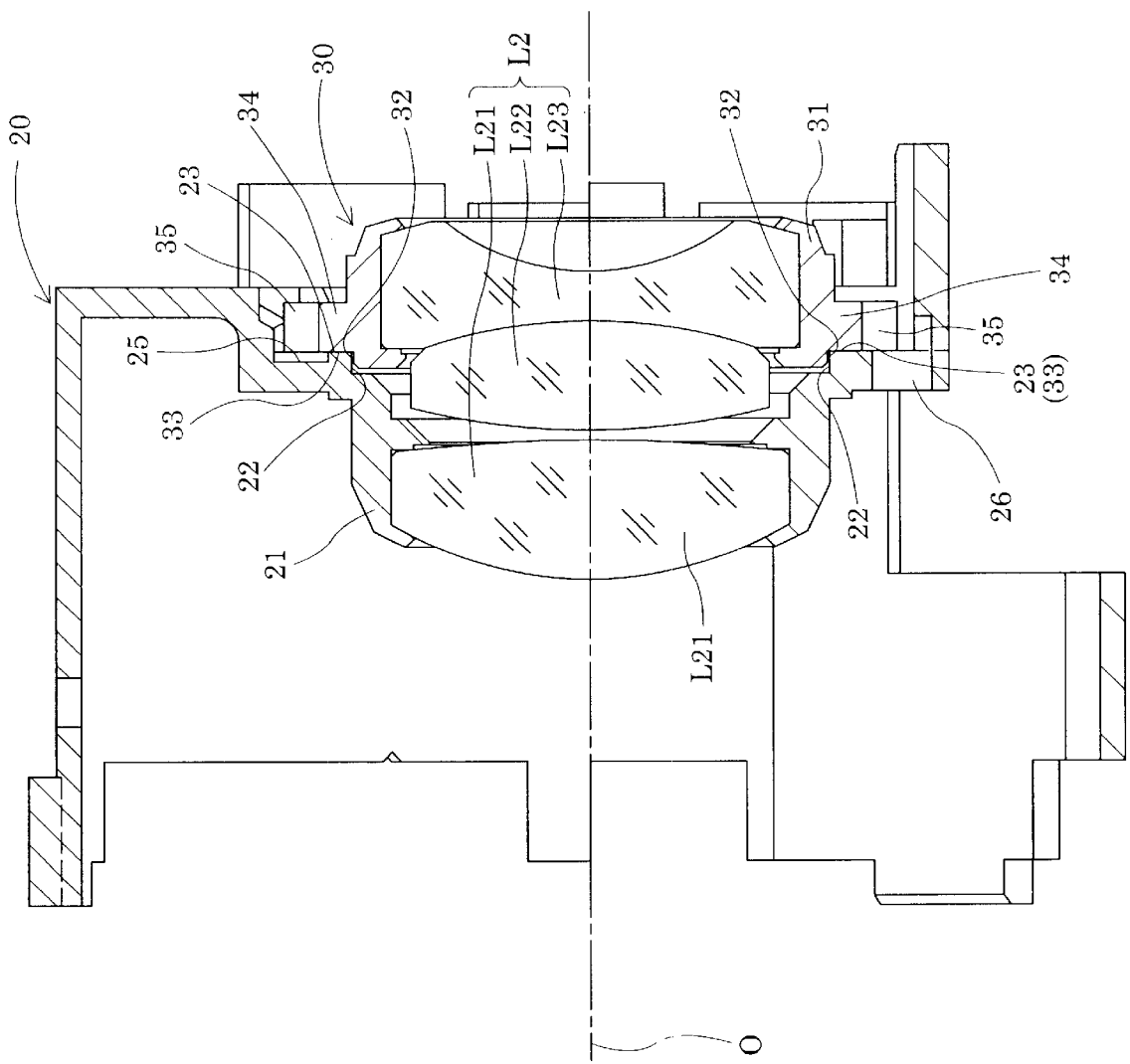
FIG. 4 is an axial cross sectional view of the moving frame, and the lens frame which supports a lens group.

As shown in FIG. 4, the first lens element L21 is fixed to an annular moving frame (first frame/first ring portion) 20 that is guided in the optical axis direction. The first lens element L21 is fitted in the moving frame 20 from the front thereof, and is fixed to the moving frame 20 by heat caulking the front annular edge of a cylindrical portion 21 of the moving frame 20. The cemented lens (L22 and L23) is supported by a lens frame (second frame/second ring portion) 30 fixed to the moving frame 20. After the middle lens element L22 is cemented to the rear lens element L23, the rear lens element L23 is fitted in the lens frame 30 from the rear thereof, and is fixed to the lens frame 30 by heat caulking the rear annular edge of a rear cylindrical portion 31 of the lens frame 30. Accordingly, the middle lens element L2 is supported by the lens frame 30 via the rear lens element L23. As can be clearly seen in FIGS. 2 and 4, the moving frame 20 is provided at a center thereof with a circular opening (central opening) 22 centered about the optical axis O of the photographing lens system. A front part of the lens frame 30 is inserted into the circular opening 22 when the lens frame 30 is fixed to the moving frame 20. The moving frame 20 is provided around the rear end of the circular opening 22 with a reference surface 23 which defines the axial fixing position of the lens frame 30 with respect to the moving frame 20 in the optical axis direction. The reference surface 23 extends in a plane normal to the optical axis O.

Figure 3:
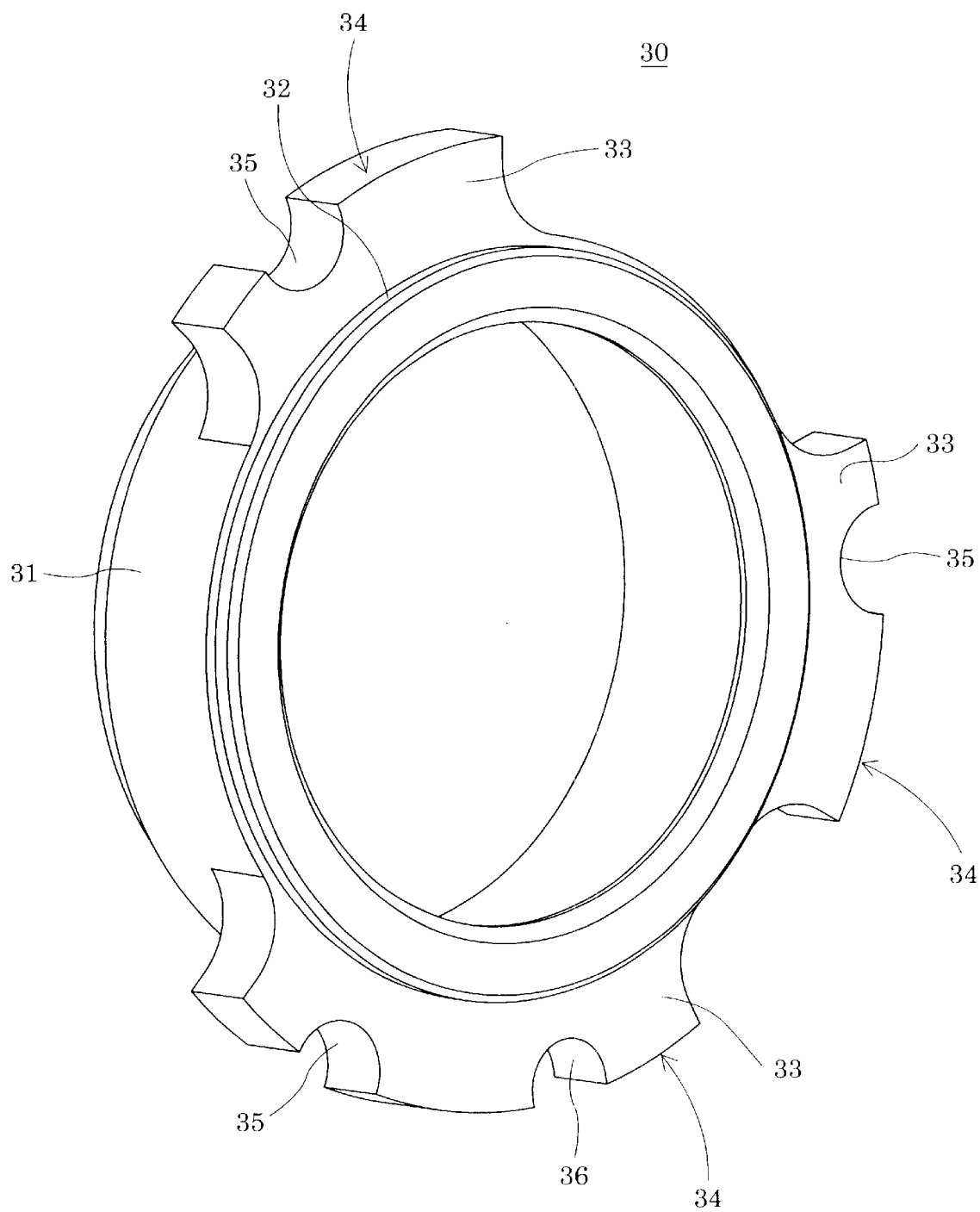
FIG. 3 is a perspective view of a lens frame shown in FIG. 1.

As shown in FIGS. 3 and 4, the lens frame 30 is provided at the front thereof with a front cylindrical portion 32 which is loosely fitted in the circular opening 22 of the moving frame 20 so as to have clearance in a radial direction between the circular opening 22 and the front cylindrical portion 32. Namely, in a state where the front cylindrical portion 32 is positioned in the circular opening 22, the front cylindrical portion 32 can move slightly with respect to the circular opening 22 of the moving frame 20 in a radial direction (i.e., in a direction normal to the optical axis). The lens frame 30 is provided, on an outer peripheral surface thereof between the front cylindrical portion 32 and the rear cylindrical portion 31, with three flange portions (radial flange/radial lugs) 34 which project radially from the lens frame 30. The front surfaces of the three flange portions 34 define reference surfaces 33 each extending in a plane normal to the optical axis O. The reference surfaces 33 are in contact with the reference surface 23 of the moving frame 20 when the front cylindrical portion 32 is fitted in the circular opening 22 of the moving frame 20. The radial clearance between the front cylindrical portion 32 and the circular opening 22 is approximately a few tens of micrometers.

As clearly shown in FIG. 3, each of the three flange portions 34 is provided with a cutout portion (first adhesive receiving recess) 35 which is recessed radially inwards from the outer edge of the flange portion 34 to have a substantially semicircle in cross section. One of the three flange portions 34 is further provided with a reference cutout portion 36 which is recessed radially inwards from the outer edge of the flange portion 34 in a manner similar to that of each cutout portion 35.

Figure 2:
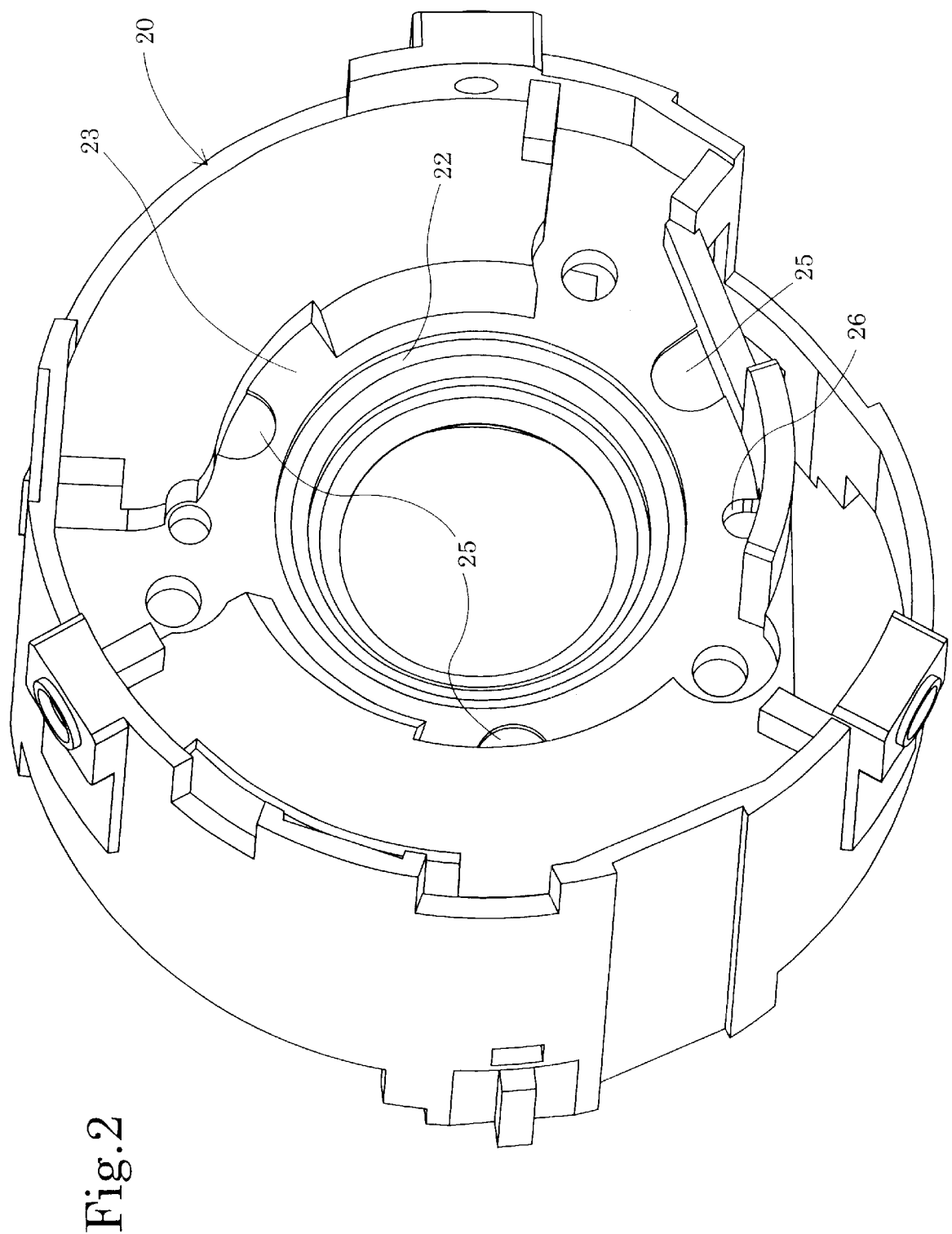
FIG. 2 is another perspective view of the moving frame shown in FIG. 1.

As clearly shown in FIG. 2, the moving frame 20 is provided on the reference surface 23 thereof with three recesses (second adhesive receiving recesses) 25 which correspond to the three cutout portions 35. The three recesses 25 are formed to be larger than the three cutout portions 35 in a direction perpendicular to the central axis (optical axis) of the lens frame 30. The moving frame 20 is further provided on the reference surface 23 thereof with a reference recess 26 to correspond to the reference cutout portion 36. The reference recess 26 and the reference cutout portion 36 constitute a relative positioning device. The three cutout portions 35 are respectively aligned with the three recesses 25 in the axial direction of the moving frame 20 and the lens frame 30 by aligning the reference cutout portion 36 with the reference recess 26 in the optical axis direction. The reference recess 26 and the reference cutout portion 36 are formed smaller than each recess 25 and each cutout portion 35 to be visually distinguished easily from each recess 25 and each cutout portion 35, respectively.

The operation in which the moving frame 20 is fixed to the lens frame 30 with an adhesive will be hereinafter discussed. Firstly, the first lens element L21 is fitted into the moving frame 20 from the front thereof, and is fixed to the moving frame 20 by heat caulking the front annular edge of the cylindrical portion 21 of the moving frame 20. Subsequently, upon the middle lens element L22 being cemented to the rear lens element L23, the rear lens element L23 is fitted in the lens frame 30 from the rear side thereof, and is fixed to the lens frame 30 by heat caulking the rear annular edge of a rear cylindrical portion 31 of the lens frame 30. Subsequently, in a state where the moving frame 20 is supported with the reference surface 23 facing upwards so that the optical axis of the first lens element L21 extends vertically, the front cylindrical portion 32 of the lens frame 30 is fitted inside the circular opening 22. At this time, the respective reference surfaces 33 of the three flange portions 34 are in contact with the reference surface 23 of the moving frame 20. In this state, the moving frame 20 and the lens frame 30 are rotated relative to each other to align the reference recess 26 with the reference cutout portion 36 so as to align substantially in the optical axis direction. This nearly aligns the optical axis of the front lens element L21 with the optical axis of the cemented lens (L22 and L23), and in this state, the three recesses 25 of the moving lens 20 are positioned immediately below the three cutout portions 35, respectively.

Subsequently, in a state where the reference surface 23 and the reference surfaces 33 remain in contact with each other, the lens frame 30 is moved radially on the reference surface 23 relative to the moving frame 20 (i.e., in a direction perpendicular to the optical axis of the front lens element L21) to align the optical axis of the cemented lens (L22 and L23) with the optical axis of the front lens element L21 precisely. This alignment operation can be carried out by an operator while he or she is viewing a certain image displayed on a TV monitor. Specific devices or methods of performing such an alignment operation can be any known devices or methods.

Figure 1:
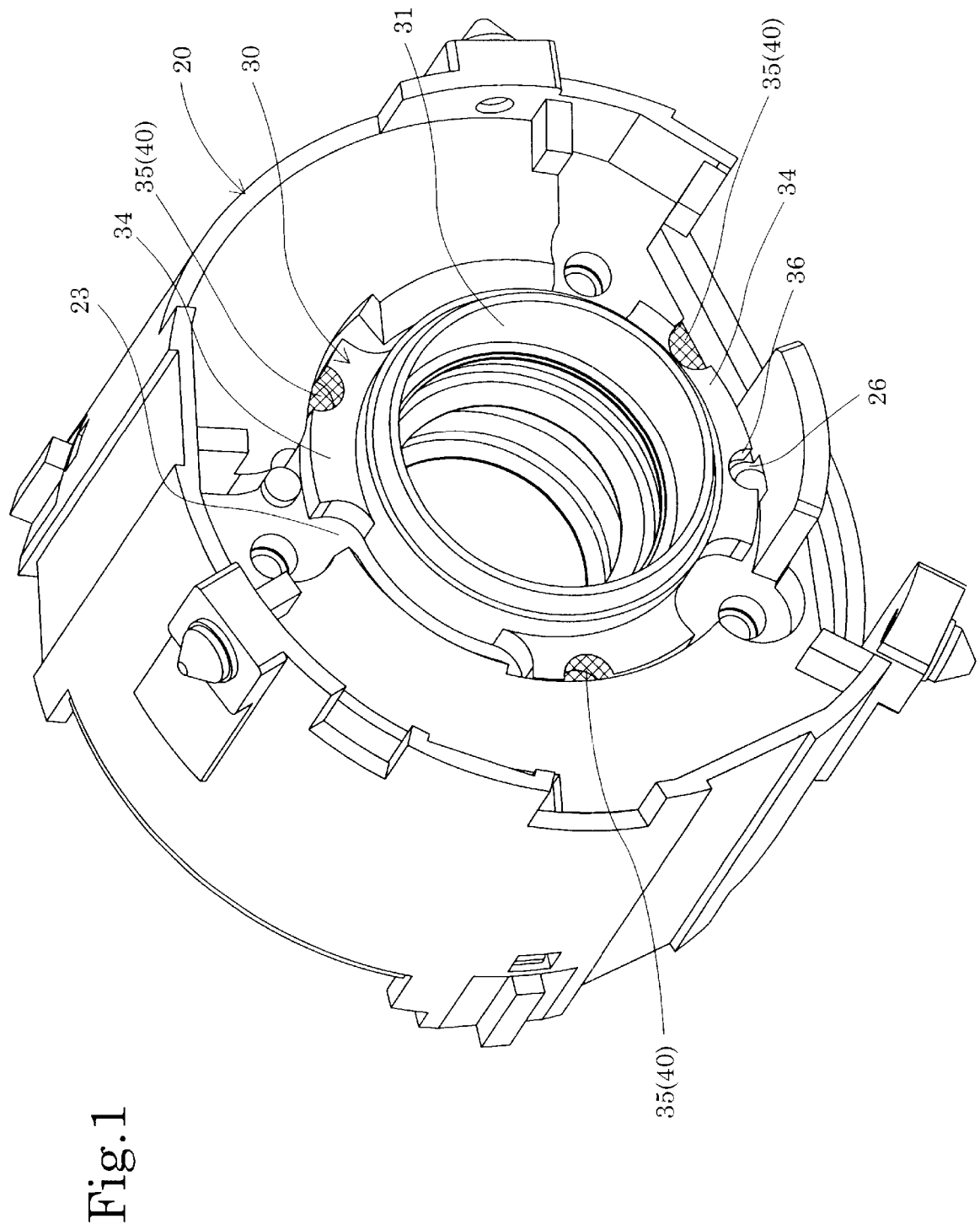
FIG. 1 is a perspective view of a moving frame and a lens frame fixed to the moving frame with an adhesive, showing an embodiment of a lens frame structure provided between the moving frame and the lens frame for centering a lens element.

Upon completion of the alignment operation, a set of three UV-curable-adhesive dropping needles (not shown) are respectively moved immediately above the three cutout portions 35 to apply an appropriate amount of UV curable adhesive into each cutout portion 35. Upon this application of UV curable adhesive, the UV curable adhesive inserted into each cutout portion 35 permeates through the three cutout portions 35 and the three recesses 25. After the permeation of the UV curable adhesive has been identified, ultraviolet light is applied to cure the UV curable adhesive. Due to the curing of the UV curable adhesive, the lens frame 30 is securely bonded to the moving frame 20 with the optical axis of the front lens element L21 being properly aligned with the optical axis of the cemented lens (L22 and L23). The three recesses 25 and the three cutout portions 35 provide large areas (adherend) to which UV curable adhesive is applied to thereby enable secure fixing of the lens frame 30 to the moving frame 20. In FIG. 1, the UV curable adhesive which is inserted into the three recesses 25 and the three cutout portions 35 are cross-hatched and designated by reference numeral 40.

Although the lens frame structure for optical axis adjustment of a lens element according to the present invention is embodied in a supporting structure of the second lens group L2 provided in the specific zoom lens barrel shown in FIG. 5, the present invention is not limited solely to the above illustrated particular embodiment, but can generally be applied to any other supporting structure of a lens group of which the amount of focusing sensitivity (eccentricity sensitivity) is large.

Although the front lens element L21 is supported by the moving frame 20 in the above illustrated embodiment, it is not necessary for any lens element to be supported by the moving frame 20. Namely, the moving frame 20 has only to be provided with the reference surface 23, which defines the axial fixing position of the lens frame 30 with respect to the moving frame 20 in the optical axis direction, and the circular opening 22, in which part of the lens frame 30 is loosely fitted with a radial clearance.

As can be understood from the foregoing, according to the present invention, a lens frame structure which makes it possible to adjust the position of a lens frame (the second frame) which supports a lens group with respect to the position of another frame (the first frame) in a direction perpendicular to an optical axis, while maintaining the position of the second frame with respect to the first frame in the optical axis direction without relying on the precision of the fit between the lens group and the second frame or the precision of the fit between the first frame and the second frame, is achieved. Moreover, since the second frame can be fixed to the first frame with an adhesive after the position of the second frame has been adjusted with respect to the first frame, the lens frame structure according to the present invention is advantageous for a lens group requiring an alignment operation with very high precision.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens frame structure for optical axis adjustment comprising:

a first frame having a central opening and a first reference surface normal to an optical axis;

a second frame supporting a lens group to be aligned with said central opening, said second frame having a radial flange which has a second reference surface normal to the optical axis and contacting said first reference surface so that the second frame is movable in a direction normal to the optical axis; and a plurality of cutout portions formed on said radial flange, wherein an adhesive is inserted into each of said plurality of cutout portions to bond said second frame to said first frame.

2. The lens frame structure for optical axis adjustment according to claim 1, wherein said second frame is provided with a cylindrical portion to be inserted to said central opening of the first frame with a radial clearance so that the second frame is movable in a direction normal to the optical axis.

3. The lens frame structure according to claim 1, wherein said radial flange is divided into a plurality of radial lugs on which said plurality of cutout portions are respectively formed.

4. The lens frame structure according to claim 2, wherein each of said plurality of cutout portions is recessed radially inwards from an outer edge of a corresponding one of said plurality of radial lugs so as to be substantially rectangular in cross section.

5. The lens frame structure according to claim 2, wherein each said plurality of cutout portions is recessed radially inwards from an outer edge of corresponding one of said plurality of radial lugs so as to be substantially semicircular in cross section.

6. The lens frame structure according to claim 3, wherein a plurality of recesses are formed on said first reference surface to correspond to said plurality of cutout portions, respectively, said adhesive permeating into said plurality of recesses from said plurality of cutout portions, respectively, when said adhesive is inserted into said plurality of cutout portions.

7. The lens frame structure according to claim 6, wherein said plurality of recesses are larger than said plurality of cutout portions in a direction perpendicular to the optical axis.

8. The lens frame structure according to claim 1, further comprising a relative positioning device for positioning said second frame relative to said first frame at a predetermined rotational angle.

9. The lens frame structure according to claim 1, wherein said adhesive comprises a UV curable adhesive.

10. The lens frame structure according to claim 6, further comprising a relative positioning device for positioning said second frame relative to said first frame at a predetermined angle of rotation;

wherein said relative positioning device includes a reference recess formed on said first reference surface, and a reference cutout portion formed on said second reference surface; and wherein said plurality of cutout portions are respectively aligned with said plurality of recesses in an axial direction of said first member and said second member by aligning said reference cutout portion with said reference recess in said axial direction.

11. The lens frame structure according to claim 10, wherein said reference recess is formed smaller than each of said plurality of recesses to be visually distinguishable from each of said plurality of recesses.

12. The lens frame structure according to claim 10, wherein said reference cutout portion is formed smaller than each said plurality of cutout portions to be visually distinguishable from each of said plurality of cutout portions.

13. The lens frame structure according to claim 1, wherein said lens element is a cemented lens comprising a front lens element and a rear lens element which are cemented to each other, said rear lens element being directly supported by said second frame so that said front lens element is supported by said second frame via said rear lens element.

14. The lens frame structure according to claim 1, wherein said first frame is guided in an optical axis direction.

15. The lens frame structure according to claim 1, wherein said lens frame structure is incorporated in a zoom lens barrel, said first frame being moved in an optical axis direction to perform a zooming operation.

16. The lens frame structure according to claim 1, wherein said lens frame structure is incorporated in a digital camera.

17. A lens frame which supports a lens group, comprising:

a first ring portion having a central opening and a first reference surface extending in a radial direction of said first ring portion; and a second ring portion supporting at least one lens element of said lens group and having a second reference surface extending in a radial direction of said second ring portion, said second ring portion being fitted into said first ring portion in a state where at least a part of said second ring portion is loosely fitted in said central opening with said second reference surface remaining in contact with said first reference surface;

wherein said second ring portion includes at least one radial flange on which said second reference surface is formed, and a plurality of cutout portions formed on said at least one radial flange, an adhesive being put into each of said plurality of cutout portions to bond said second ring portion to said first ring portion.

* * * * *